United States Patent Office 3,652,623
Patented Mar. 28, 1972

3,652,623
ORGANIC ALUMINUM COMPOUNDS
Shigeaki Washio and Shunji Araki, Befucho, Kakogawa, Japan, assignors to Taki Kasei Co., Ltd., Kakogawa, Japan
No Drawing. Filed Sept. 24, 1968, Ser. No. 762,130
Claims priority, application Japan, Sept. 30, 1967, 42/63,152, 42/63,153
Int. Cl. C07f 5/06
U.S. Cl. 260—448 AD  3 Claims

ABSTRACT OF THE DISCLOSURE

Complex organic aluminum compounds of the following empirical formula: $Al_xCl(OR)_yO_z$ wherein R is an alkyl radical having from 1 to 8 carbon atoms; $x$, $y$, and $z$ are numbers between 1.5 and 5.0, 3.0 and 7.0 and 1.5 and 3.5, respectively, and $y+2z=3x-1$ are disclosed. The compounds have astringent-antiperspirant properties.

---

This invention relates to a group of new organic aluminum compounds, and also to a process of making them and to compositions containing them.

More particularly, the invention relates to a group of novel organic aluminum compounds having alkoxyl groups, chlorine atoms and Al—O—Al linkages in a molecule, and to their preparation by effecting under controlled conditions partial condensation reaction of an alkoxy aluminum chloride of the type, $$Al_{1.5-5.0} \cdot (OR)_{3.5-14.0} \cdot Cl$$

wherein R is an alkyl radical having from 1 to 8 carbon atoms.

It is among the objects of this invention to provide a group of new organic aluminum compounds and novel methods for their preparation.

A particular object is to provide a group of new organic aluminum compounds having good solubility in various organic solvents, such as alcohols, hydrocarbons, halohydrocarbons, etc.

A further object is to provide novel methods for preparing a group of new organic aluminum compounds which have not only good solubility in organic solvents but also astringent-antiperspirant characteristics, and therefore are adaptable to a variety of commercial applications.

A further object is to provide a composition having astringent and antiperspirant properties.

Further objects and advantages of the invention will be apparent from the following description.

The new compounds of the present invention comprise complex organic aluminum compounds of the following empirical formula:

$$Al_xCl(OR)_yO_z$$

wherein R is an alkyl radical having from 1 to 8 carbon atoms; $x$, $y$ and $z$ are numbers between 1.5 and 5.0, 3.0 and 7.0 and 0.15 and 3.5, respectively, and $y+2z=3x-1$.

It should be noted however that the above empirical formula merely shows suitable ranges of proportions of the components of the product and does not necessarily indicate a molecular composition or structure, and the number of Al atoms connected each other through Al—O—Al linkages or coordinate valences in a single unit or molecule of each complex is not precisely known but is believed to vary over the range of from about 2 to about 15.

The complex organic aluminum compounds of this invention are in general transparent amorphous solids at room temperature and have remarkable astringent-antiperspirant properties. Further, they show outstanding solubility in various organic solvents, such as hydrocarbons, halohydrocarbons, alcohols, ethers, etc.

The new compounds of the present invention may be prepared by heating, in the absence of any solvent, an alkoxy aluminum chloride of the formula, $$Al_{1.5-5.0}(OR)_{3.5-14.0}Cl$$

wherein R indicates an alkyl radical with 1 to 8 carbon atoms, under atmospheric or slightly reduced pressure at about 180° C.–350° C. until the system, increasing its viscosity, loses some of its weight and crystallinity through the removal of volatile materials to give an amorphous or resinous product when cooled.

It is preferable that the reaction temperature should be about 50° C.–250° C. higher than the melting point of the alkoxy aluminum chloride used. The reaction time may vary depending upon the particular reaction conditions and the solubility required of the product, but in general 1–3 hours or, at the longest, 5 hours may suffice. The "End Point" of the reaction, not implying the completion of condensation, may be determined conveniently by checking the solubility of each sample taken out at appropriate intervals of time.

When, for example, $Al_2(OR)_5Cl$ is taken as a starting material, the reaction pattern may be schematically illustrated as follows:

$$Al_2(OR)_5Cl \rightarrow Al_2(OR)_{5-2x}Cl \cdot O_x + xR_2O$$

wherein $x$ is a number from about 0.095–1.72.

In practice, $R_2O$ is the dominant volatile material during the condensation and its evolution inevitably causes the formation of an Al—O—Al linkage as shown below:

$$>Al-OR + RO-Al< \rightarrow >Al-O-Al< + R_2O$$

Likewise, the evolution of a minor amount of R—Cl observed during the condensation may also be attributed to the formation of Al—O—Al linkages.

When the condensation reaction is carried out to such an extent as nearly to the completion, the composition of the reaction product approaches to that of alumina and the solubility in organic solvents again decreases. When the condensation reaction is not effected enough, no improvement in solubility can be achieved.

To accomplish the objects of the invention, it is most desirable to choose the reaction conditions so that the molar ratio of Al—O—Al group to —OR, [O/(OR)], in the product may fall in the range of 0.02–1.1.

In Table 1 are shown the experimental results on the relation of O/(OR) of the partial condensation products of $Al_2(OC_2H_5)_5Cl$ to the solubility data in some organic solvents.

TABLE 1

| Molar ratio O/(OC₂H₅) | 0 | 0.013 | 0.025 | 0.04 | 0.06 | 0.10 | 0.50 | 1.10 | 1.50 |
|---|---|---|---|---|---|---|---|---|---|
| Ethanol | C | C | B | A | ∞ | ∞ | ∞ | A | B |
| Dichloroethylene | C | C | B | A | ∞ | ∞ | ∞ | B | C |
| Petroleum ether | C | C | B | B | ∞ | ∞ | ∞ | B | C |

1. Samples were prepared under the following condition: 270° C.; 620 mm. Hg; ½–10 hours.
2. Symbols ∞, A, B and C indicate the solubility as follows:
 ∞: Soluble in almost all proportions.
 A: Excellent.
 B: Fair.
 C: Poor.

The alkoxy aluminum chlorides to be used in the present invention may be prepared by any known method—for instance, by the method described by H. Ulich and W. Nespital, Z. Physic. Chemie (Abt A) 165 (1933) pp. 294–310 (reaction between an aluminum alkoxide and an excess amount of anhydrous aluminum chloride in $CS_2$), or by one described in U.S. Pat. No. 2,823,169 (in its Example 2, as a special case, the reaction between aluminum chloride and aluminum powder in ethanol is described).

A preferred method, however, comprises reacting anhydrous aluminum chloride or hydrogen chloride with an appropriate amount of aluminum alkoxide without using any solvent or, if necessary with the help of an appropriate solvent. In the latter case the solvent should be eliminated in advance to the subsequent condensation reaction.

The alkoxy aluminum chlorides thus prepared can be employed as such or after purification as a starting material of the present invention.

The alkoxy aluminum chlorides stated above should have the empirical formula, $Al_{1.5-5.0}(OR)_{3.5=14.0}Cl$, in which the atomic ratio of Al to Cl, Al/Cl, is 1.5–5.0.

Alkoxy aluminum chlorides having other compositions, and hence having other Al/Cl ratios, seem to be unsuited for the purpose of the present invention, for those having lower Al/Cl atomic ratios give products of poor solubility while those of higher Al/Cl ratios give unstable products which show rather good solubility at first but give rise to sedimentation after standing.

The term "alkoxy aluminum chloride" as used herein does not necessarily mean a single chemical species but may also imply a mixture of component materials in such proportions as previously indicated. Hence, in practice, the alkoxy aluminum chloride need not be employed in isolated form but may be formed in situ. Thus, for example, the following reaction systems have been found applicable to the present invention:

(1) $Al(OR)_3$—$AlCl_3$ (molar ratio, 3.5–14:1)
(2) $AlCl_3$—Al—ROH (molar ratio, 1:3.5—14:$\geqq$10.5)
(3) $Al(OR)_3$—HCl (molar ratio, 1.5–5.0:1)

wherein R indicates an alkyl radical with 1 to 8 carbon atoms.

The reaction (1) may be carried out in the absence of a solvent at temperature higher than the melting point of the alkoxide. The partial condensation reaction seems to proceed in parallel with or by way of the formation of the alkoxy aluminum chloride depending upon the reaction temperature. The temperature may be varied continuously or stepwise within the range from about 150° C.–350° C. during the reaction. The reaction may be conducted under these conditions for 1–5 hours until the system, while giving off the volatile material, turns into a homogeneous viscous liquid or glassy mass easily soluble in such organic solvents as previously stated.

The reaction (2) may be conducted analogously except that in this reaction alcohols with comparatively low boiling point participate and the evolution of hydrogen is involved so that the reaction temperature can not be raised higher than the melting point of the corresponding aluminum alkoxide until the evolution of hydrogen has ceased and the execess alcohol, if present, has been distilled off.

The reaction (3) may also be conducted in an analogous manner. In this case, however, anhydrous HCl has to be dealt with so that the use of a closed-type reaction vessel e.g. an autoclave may be preferred. The reaction proceeds at temperatures from about 150° C.–350° C. while giving off volatile materials, such as alcohol and ether. The product is recovered after 1–5 hours of the reaction.

As is evident from the description above, even the formation of a free alkoxy aluminum chloride may not be essential to the invention. The reaction may proceed through the formation of alkoxy aluminum chloride or may proceed otherwise.

Alkoxy aluminum chlorides themselves are, in general, more or less soluble in various organic solvents but in most cases to an extent not sufficient for commercial uses( especially when hydrocarbons or halohydrocarbons alone are used as solvents). They are known to have astringent-antiperspirant properties (in British Pat. No. 795,222, various kinds of alkoxy aluminum chlorides and compositions containing the same are claimed as to their antiperspirant and/or astringent activity), but the insufficient solubility seems to restrict the practical use.

The products of the present invention, however, while keeping the astringent-antiperspirant properties of the starting material, show an overwhelming improvement in their solubility in various organic solvents especially in hydrocarbons, halohydrocarbons, etc. and thereby make it possible to apply them to a variety of commercial uses. Apparently, one of the most promising uses would be an aerosol type astringent-antiperspirant composition containing the product of this invention, because the products of the present invention not only keep the remarkable astringent-antiperspirant properties of an alkoxy aluminum chloride but intensify them with the outstanding solubility in alcohols, propellants such as Freon 12, Freon 113, Freon 114 or mixtures thereof and humectants or emolients such as ethylene glycol, propylene glycol or other glycols, glycerol, sorbitol, glycolmonostearates, glycolmonolaurates, glycerol- and sorbitol monostearates or monolaurates, etc.

Moreover the new organic aluminum compounds of the present invention, when properly selected, show pH's in the range of 3.7–5.4 (in aqueous solution containing 5% $Al_2O_3$) which are closer to neutral than those shown by aluminum chloride, one of the most effective antiperspirants hitherto known. In Table 2 are shown the experimental results on some properties above mentioned of several typical products of the present invention having a common O/OR molar ratio of about 0.1.

TABLE 2

| Al/Cl atomic ratio | 1.07 | 1.55 | 1.73 | 2.16 | 3.12 | 5.00 | 6.90 |
|---|---|---|---|---|---|---|---|
| Solubility in $C_2H_5OH$ [1] | C | B | A | ∞ | ∞ | A | P |
| Solubility in $CCl_2F_2$ [1] | C | A | A | ∞ | ∞ | ∞ | P |
| pH [2] (at 30° C.) | 2.9 | 3.7 | 4.1 | 4.4 | 4.7 | 4.9 | 5.4 |
| Astringency (percent) [3] | 30.4 | 34.1 | 34.1 | 36.7 | 35.8 | 21.2 | 5.3 |

[1] These were determined after standing 3 months at 30° C, under the pressure of 6 atms. Each symbol indicates the solubility as follows:
∞: Soluble in almost all proportions,
A: Excellent,
B: Fair,
C: Poor,
P: Soluble at first but giving rise to sedimentation later.
[2] Of the aqueous solution containing 5% $Al_2O_3$.
[3] These values were obtained by measuring the shrinkage (percent) of the abdominal skins of a frog, which were immersed in the ethanol solution of each sample ($Al_2O_3$ conc.—5%) at 25° C.

These comparatively higher pH values are favorable in that they do not cause any substantial irritation to the skin, any perceivable damage to fabrics, or any corrosive damage to the aerosol spray container.

In view of these advantages of the new aluminum compounds of this invention, highly effective antiperspirant compositions of aerosol type can be produced by incorporating the new aluminum compounds of the present invention in a concentration range of from about 5% to about 40% into aerosols.

Likewise other types of astringent and/or antiperspirant compositions such as alcoholic solutions, ointments, lotions, creams, powders, etc. can be made as well. If desired, such compositions may also contain perfumes, emolients, humectants, bactericidal agents, etc. In some special cases, a concentration of the new aluminum compounds of more than 40% may advantageously be employed according to the properties required of the compositions.

Among the new aluminum compounds of this invention, particularly suited for the preparation of aerosol type astringent-antiperspirant compositions are those in which the atomic ratio (Al/Cl) is from about 2.0 to 3.0 and the molar ratio (O/OR) is in the range of from about 0.02 to 1.1, R being as defined before.

The invention will be further illustrated by referring to the following examples wherein all parts are by weight. These examples are for illustration only and not to be construed as limiting the scope of our invention.

EXAMPLE 1

100 g. aluminum ethoxide was melted by heating it to 180° C. (under dry $N_2$ stream). Then there were added portionwise 16.4 g. of anhydrous aluminum chloride, while stirring vigorously. In a short time they were dissolved into a homogeneous state of the composition, $$Al_2Cl(OC_2H_5)_5$$

(Al/Cl atomic ratio 2; $O/OC_2H_5$ molar ratio 0; only slightly soluble in alcohols and other solvent).

Then the temperature of the system was raised to 270° C. and the pressure was reduced to 720 mm. Hg. This state was maintained, while stirring, for 3 hours to make the condensation reaction to proceed.

Then the reaction product was cooled and solidified, to obtain 105 g. of brownish yellow resinous mass. The product on analysis showed $Al_2O_3$ 37.31%, Cl 11.97% (Al/Cl atomic ratio 2.18), $OC_2H_5$ 64.8% and $O/OC_2H_5$ molar ratio 0.147, which indicated an empirical formula, $$Al_{2.18}Cl(OC_2H_5)_{4.260}O_{0.625}$$

This product was soluble practically in all proportions in methanol, ethanol and other various organic solvents of the type previously stated.

The gas evolved during the condensation reaction was conducted to a Dry Ice-cooled trap and on analysis proved to be mostly $(C_2H_5)_2O$.

If necessary, the product can be easily decolorized by the treatment with active carbons.

By the same procedure as stated above, two other types of ethoxy aluminum chloride, $AlCl(OC_2H_5)_2$ (Al/Cl atomic ratio 1) and $Al_6Cl(OC_2H_5)_{17}$ (Al/Cl atomic ratio 6) respectively were subjected to condensation reaction but neither product gave any favorable result as to the solubility.

EXAMPLE 2

10.7 g. anhydrous aluminum chloride was dissolved in 200 g. isopropanol while cooling and stirring. The solution was then stirred with 10.8 g. of aluminum powder under a reflux condenser. The reaction was proceeded by slight heating. The product solution, depositing crystals when cooled, was reheated and filtered while hot to give a light yellow solution. This was then stripped of isopropanol by vacuum distillation to leave a white crystalline solid which on analysis was determined to be $Al_2Cl(OC_3H_7)_5$ ($Al_2O_3$ 26.51%, Cl 9.23%, Al/Cl atomic ratio 2, and $O/OC_3H_7$ molar ratio 0). And its solubility in organic solvents previously referred to was poor.

This $Al_2Cl(OC_3H_7)_5$ was subjected to condensation reaction by heating it at 265° C. for 3.5 hours while stirring under 720 mm. Hg (dry $N_2$ stream).

The product solidified by cooling was resinous mass, the analysis of which showed $Al_2O_3$ 31.60%, Cl 10.98% (Al/Cl atomic ratio 1.97), $OC_3H_7$ 69.9% and $O/OC_3H_7$ molar ratio 0.142, which led to an empirical formula, $Al_{1.17}Cl(OC_3H_7)_{3.826}(O)_{0.542}$. It could be dissolved in almost all proportions in methanol, ethanol, isopropanol, benzene, toluene, xylene, petroleum ether, light oil and mixtures thereof.

According to the same procedure as stated above, a condensation product in which Al/Cl atomic ratio is 2.5 and $O/OC_3H_7$ molar ratio is 0.015 was prepared, but it was found to have much inferior solubility to that of the product in the first trial in this example.

EXAMPLE 3

To 100 grams ethoxy aluminum chloride $$Al_2Cl(OC_2H_5)_5$$

prepared just as in Example 1 ($Al_2O_3$ 32.38%, Cl 11.27%), there were added 125 grams n-butanol and 260 grams cyclohexane, and trans-alcoholysis or alcohol-exchange reaction was conducted in a distillation flask. Liberated ethanol was distilled off azetoropically with cyclohexane leaving pentabutoxy dialuminum chloride, $Al_2Cl(OC_4H_9)_5$ ($Al_2O_3$ 22.41%, Cl 7.80%). Then the residue was heated up to 250° C. and at this temperature stirred for 3.5 hours under normal pressure (dry air stream). After cooling there was obtained an amorphous glassy mass which analyzed as follows: $Al_2O_3$ 23.72%, Cl 8.27% (Al/Cl atomic ratio 2.05), $OC_4H_9$ 77.7%, $O/OC_4H_9$ molar ratio 0.065 ($Al_{2.05}Cl(OC_4H_9)_{4.560}O_{0.295}$). This product was soluble in almost all proportions in n-butanol, methanol, ethanol, glycerol, ethylene glycol, benzene, styrene and dichloroethane.

EXAMPLE 4

100 grams $Al(OC_2H_5)_3$ was heated to 240° C. in an autoclave. 11.2 parts anhydrous HCl was then introduced at the rate of 0.6 gram/min. through a conduit reaching the bottom. Ethanol liberated during the reaction was distilled off and a white crystalline product of the composition, $Al_3Cl(OC_2H_5)_8$, was obtained, which was hardly soluble in usual organic solvents.

This crystalline mass was then heated to 280° C. and the melt was stirred for 3 hours under 750 mm. Hg dry air. It added to viscosity during the reaction and after cooling turned to a resinous brittle solid, which analyzed as follows: $Al_2O_3$ 35.39%, Cl 8.03% (Al/Cl atomic ratio 3.97), $OC_2H_5$ 70.9%, $O/C_2H_5$ molar ratio 0.09

$$(Al_{3.07}Cl(OC_2H_5)_{6.950}O_{0.630})$$

This product was soluble in n-butanol, ethanol, methanol, benzene, styrene, dichloroethane, trichloroethylene, etc. to such an extent as the solution itself became viscous, hard-to-flow liquid or glassy semi-solid.

EXAMPLE 5

15 g. of the product prepared in Example 1, $$Al_{2.17}Cl(OC_2H_5)_{4.260}O_{0.625}$$

was dissolved in 30 g. ethanol, to which 0.25 g. perfume and 1 g. polyethylene-glycol-monostearate were added. Then a mixture of Freon 114 and Freon 12 (mixing ratio 3:2) was compressed into the solution in a 100 ml. aerosol spray can until the can was nearly filled up.

After thorough mixing and standing 6 months at room temperature (15–25° C.), spraying tests were conducted repeatedly. It was shown to work well. Unfavorable phenomena such as phase separation and chemical change of the ingredients were not observed. Spraying tests onto human skin satisfactorily showed outstanding astringent-antiperspirant properties causing no irritation to the skin or any other physiological hazard.

EXAMPLE 6

15 g. of the product prepared in Example 2, $$Al_{1.97}Cl(OC_3H_7)_{3.826}O_{0.542}$$

was dissolved in 30 g. ethanol to which 5 g. ethylene glycol and 0.5 g. perfume were added. Then the whole was mixed with Freon 12 under compression in a 100 ml. aerosol spray can.

After standing 4 months at 50° C., spraying tests were conducted and satisfactory results were obtained both on mechanical workability and on the astringent-antiperspirant effect of the composition. Then the total content were sprayed out and the inner wall of the can (tinned plate) was examined. There was no sign of corrosion observable.

EXAMPLE 7

20 g. of the final product prepared in Example 3, $$Al_{2.05}Cl(OC_4H_9)_{4.560}O_{0.295}$$

was dissolved in 35 g. ethanol, to which 5 g. sorbitolmonolaurate and 0.5 g. perfume were added and the whole was dissolved under compression in a mixed propellant of Freon 114 and Freon 12 (mixing ratio 3:2) in a 100 ml. aerosol spray can.

Another sample very much alike were also prepared in which, however, in place of sorbitolmonolaurate, 5 g. of $$HO\!-\!(C_2H_{40})_n\!-\!(C_3H_{60})_m\!-\!(C_2H_{40})_n\!-\!H$$

($n$, 40, $m$, 60) was used.

Both worked well after standing 6 months at room temperature and showed satisfactory astringent-antiperspirant characteristics and compatibility with human skin.

What is claimed is:

1. A group of new compounds of the following empirical formula:

$$Al_xCl(OR)_yO_z$$

wherein R is an alkyl radical having from 1 to 8 carbon atoms; $x$, $y$ and $z$ are numbers between 1.5 and 5.0, 3.0 and 7.0, and 0.14 and 3.5, respectively, $y+2z$ being equal to $3x-v$.

2. A group of new compounds as defined in claim 1, wherein R is an ethyl radical.

3. A group of new compounds as defined in claim 1, wherein $x$ is from about 2.0 to about 3.0.

References Cited

UNITED STATES PATENTS 2,801,190    7/1957    Orthner et al.
                                        260—448 AO UX

FOREIGN PATENTS 806,113    12/1958    Great Britain ____ 260—448 AO
806,182    12/1958    Great Britain ____ 260—448 AO JAMES E. POER, Primary Examiner H. M. S. SNEED, Assistant Examiner U.S. Cl. X.R.

424—68